W. D. LUDLOW.

Fruit Can.

No. 1,656.

Reissued April 19, 1864.

Witnesses
Thos Mkell
C. R. Hale

Inventor
W D Ludlow

BEST AVAILABLE COPY

UNITED STATES PATENT OFFICE.

N. P. STANTON, OF NEW YORK, N. Y., ASSIGNEE OF WM. D. LUDLOW.

IMPROVED PRESERVE-CAN.

Specification forming part of Letters Patent No. 24,566, dated June 28, 1859; Reissue No. 1,656, dated April 19, 1864.

*To all whom it may concern:*

Be it known that WILLIAM D. LUDLOW, of the city, county, and State of New York, has invented a new and useful Improvement in Sealing Provision-Cans and other Vessels; and I, N. P. STANTON, of the city, county, and State of New York, having, by assignment duly recorded in the Patent Office, become the sole owner of said invention, do hereby declare that the following is a full, clear, and exact description of the same, reference being had to the accompanying drawings, making a part of this specification, in which—

Figure 1:
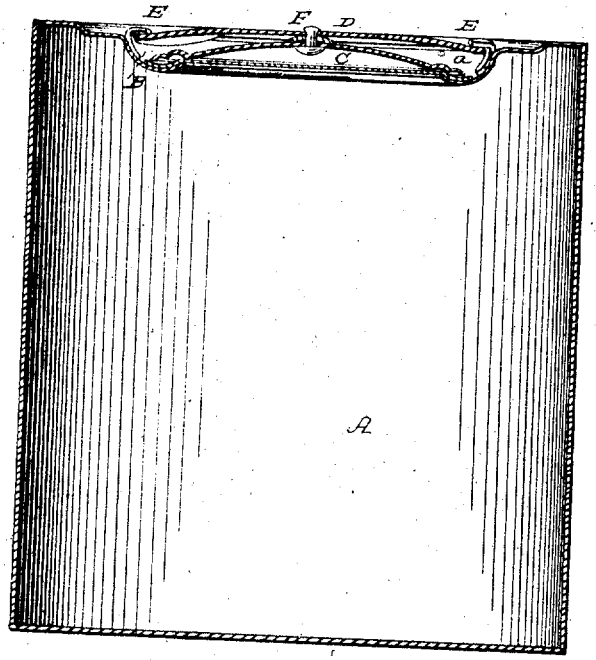
Figure 2:
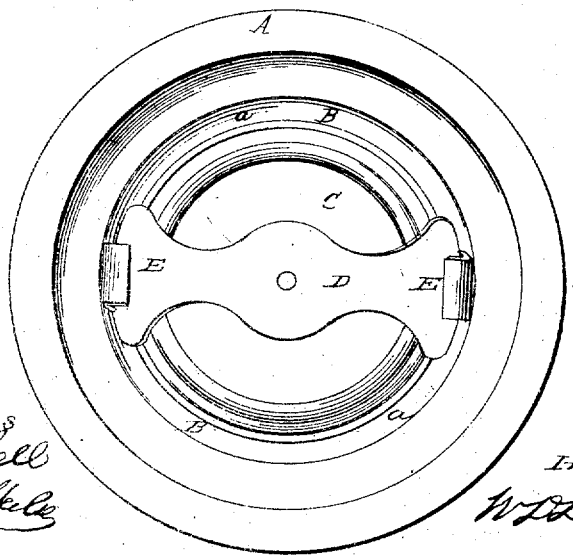

Figure 1 represents a vertical central section of said invention. Fig. 2 is a top view of the same.

Similar letters of reference in both views indicate corresponding parts.

This invention relates to the means employed for securing the cover down upon the neck of the can or vessel.

The nature of the invention and its peculiar advantages will be readily understood from the following description.

A is a can or vessel, made of tin, glass, earthenware, or any other suitable material, and provided with a depression or concavity, *a*, in its top, which receives an india-rubber gasket, B.

C is the cover, which may be made of the same or of different material as the body of the can or vessel, and which has sufficient external convexity for rigidity and strength. It is provided with a vertical flange at its periphery, adapted to sink into the gasket B, so as to form an air-tight joint.

D is a key or cross-bar, which may be pivoted in the center to the cover C or placed loosely on the same, and which is formed with oblique ends I I, adapted to engage beneath oblique lugs E E upon the can.

F is a small disk or protuberance, of metal or other suitable material, which may be placed beneath the cross-bar D concentrically with its pivot or center, so as to cause the pressure to take effect in or about the center of the cover and prevent contact between the key and cover near the periphery; or it may be made solid with the cover or cross-bar; or, if the cover is sufficiently convex, it may be dispensed with altogether.

To close the can or vessel, the gasket and cover are placed in the position shown and the key or cross-bar D is rotated, so as to pass its oblique ends I I beneath the lugs E E until the wedge-like action compresses the cover upon the gasket with sufficient force. The lugs E E are soldered or otherwise secured on the inner face of the concavity *a*, in order that the side of the said concavity may form a back or brace to prevent the rupture of the solder or fastening by the forcing of the key beneath the lugs. The key or cross-bar D has sufficient elasticity to permit the escape of steam in the event of undue pressure occurring within the can, and thereby a well-known and prolific source of imperfection in the joints of provision-cans is corrected. Upon the cooling of the contents, and consequent condensation of the steam, the external pressure compresses the cover more tightly upon its seat and the ingress of air is effectually prevented. This elasticity of the key or cross-bar has another important advantage when the can or vessel is partly or wholly made of glass. The yielding pressure exerted by the same obviates the breakage of the vessel or the crushing of the cover. The rapidity with which an air-tight joint is formed by this arrangement and the facility for retracting the key without removing the cover afford means to test a can previous to using in the following manner: A test of the can is made after the provisions or fruit have been put in, to know that the contents are keeping. When the contents are cold, turn back the key, and if the cover is held firmly down by atmospheric pressure the can is tight and the contents safe; or, to test before using, a piece of lighted paper is placed within the can and the cover quickly closed down in the manner before described. A partial vacuum is formed in the can, and if, on retraction of the key, it is found that the cover remains tightly closed by atmospheric pressure, the can is proved to be tight in all its joints. By this means the loss which occurs from putting up edibles in cans having unseen imperfections in their joints may be entirely avoided. It is not absolutely essential that the key ends and the lugs should both be beveled. The same result can be obtained in an inferior manner by the combination of straight lugs with a beveled key, or vice versa.

What I claim as new, and desire to secure by Letters Patent, is—

1. The employment or use, for closing a can or vessel for preserving provisions, &c., of a key or cross-bar, D, and lugs E E, attached to the inner side of a rim or cavity, *a*, on the can, to prevent the disruption of said lugs in closing the can, and to avoid projections.

2. The use of a convex cover, C, in combination with a cross-bar, D, or its equivalent, applying the force by which said cover is held down to or about the center of the same.

3. In combination with a can or vessel, A, cover C, and lugs E E, the elastic cross-bar D, pivoted to the cover C, and adapted to hold it down with a yielding pressure, as explained.

N. P. STANTON.

Witnesses:

W. HAUFF,

JAS. WHITELAW.